Nov. 23, 1965
I. L. JOY
3,218,846
ULTRASONIC FLAW TESTING APPARATUS
Filed Oct. 26, 1960
2 Sheets-Sheet 1
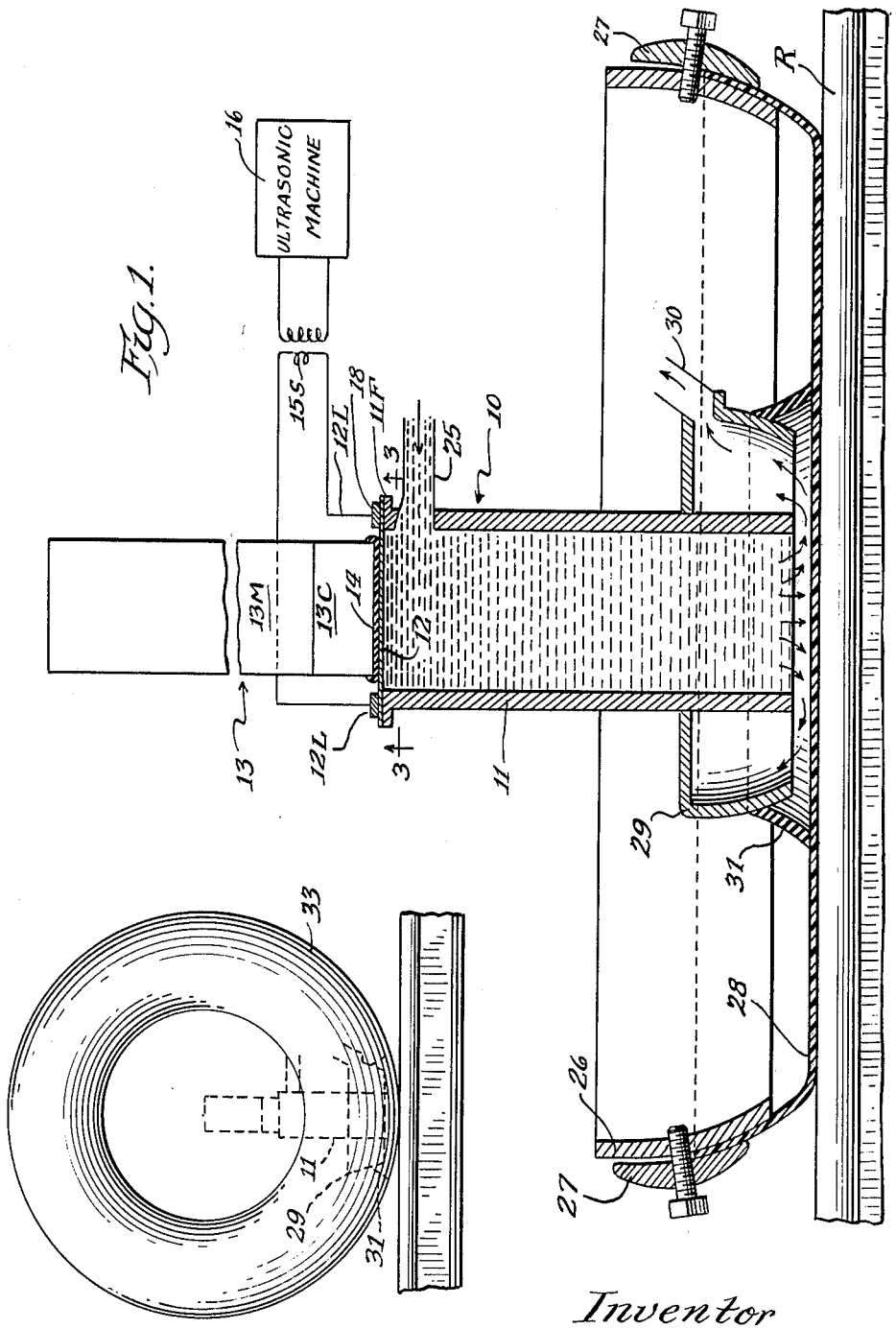
Inventor
Ivan L. Joy.
By Mann, Brown & McWilliams
Attys.

Nov. 23, 1965  I. L. JOY  3,218,846
ULTRASONIC FLAW TESTING APPARATUS
Filed Oct. 26, 1960  2 Sheets-Sheet 2
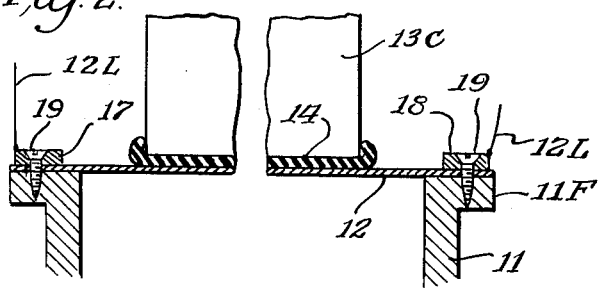
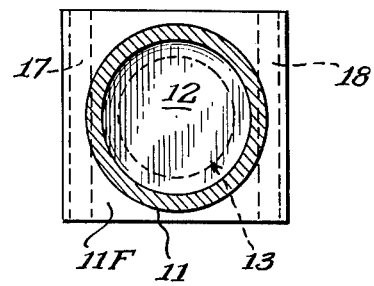
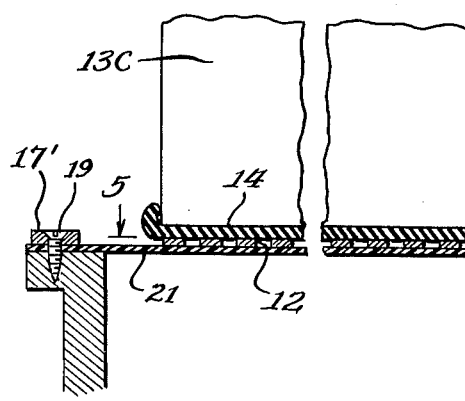
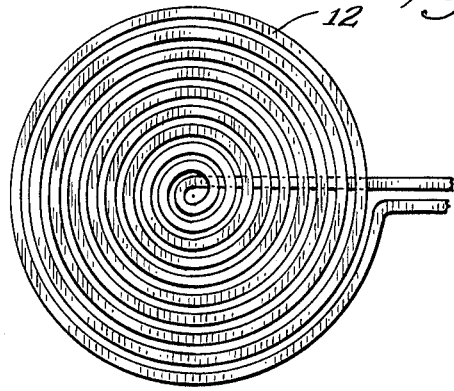
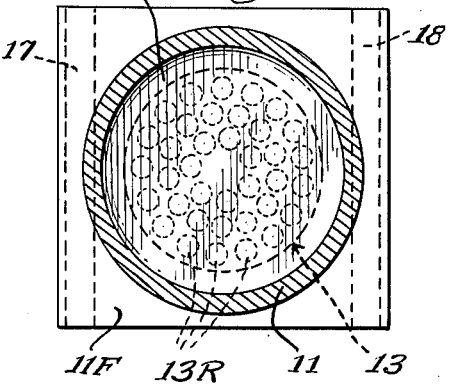
Inventor
Ivan L. Joy.
By Mann, Brown & McWilliams
Attys.

United States Patent Office 3,218,846
Patented Nov. 23, 1965

3,218,846
ULTRASONIC FLAW TESTING APPARATUS
Ivan L. Joy, Topeka, Kans., assignor to Chemetron Corporation, Chicago, Ill., a corporation of Delaware
Filed Oct. 26, 1960, Ser. No. 65,103
13 Claims. (Cl. 73—71.5)

This invention relates to apparatus for use in utrasonic flaw testing and more particularly is concerned with an improved electromechanical transducing and coupling unit for use in continuous progressive ultrasonic rail flaw testing.

In ultrasonic flaw testing, the use of resonant type transducers has always involved an objectionable ringing effect which impairs the resolution of the system and, for example, prevents testing of the regions close to the entering surface of the test body. Normally a considerable depth adjacent the entering surface is obscured by ringing of the transducer element. A ringing interval on the order of from 5 to 20 microseconds is not uncommon and corresponds to a depth range of from 5/8 inch to 2 inches in steel. To limit this ringing effect, detuning has been used and various mechanical and electrical damping systems have been devised and while some improvement has resulted, the resonant type transducer element remains the primary drawback to the achievement of high resolution in ultrasonic flaw testing systems.

A principal object of this invention is the provision of a high resolution electromechanical transducer that exhibits no tendency to ring and that requires no external damping.

This is accomplished by the use of a wide band type of transducer element having substantially infinite mechanical impedance. The element comprises a source of magnetic flux having a current carrying foil disposed crosswise in its magnetic field for converting short bursts of electric current applied to the foil into mechanical vibration of the foil.

In ultrasonic rail flaw testing, it is desirable that the infinite impedance transducer element be spaced apart from the rail to avoid mechanical damage to this sensitive and fragile element and to eliminate inductance affects upon the transducer resulting from the presence of the large metal rail.

Accordingly, a liquid column is interposed between the transducer and the rail to function as a couplant for transmitting ultrasonic energy therebetween. In this connection, it has previously been proposed to utilize a rubber bulb or boot for confining the coupling liquid and for excluding the dirt, sand and grease on the rail from entering the coupling liquid system but the bulb or boot would not quickly conform itself to the varied rail contour. For example, at rough rail ends it is sometimes necessary for the boot material to distort or displace itself in conformity to rail contour changes in 1/100 of a second. To achieve such a rapid response, tremendous pressures would be required within the boot, and the practical difficulties attendant to the employment of such high pressures preclude this approach in progressive rail flaw testing.

An object of the present invention is the provision, in a coupling liquid unit for ultrasonic rail flaw testing, of a liquid retaining diaphragm for contact with the rail in combination with a continuously flowing coupling liquid column arranged to impinge upon the diaphragm to urge the same against the rail and to cause it to undergo substantially instantaneous contour changes in conformity with rail surface contour changes.

Other objects and advantages will become apparent during the course of the following description.

In the accompanying drawings forming a part of this specification and in which like numerals are employed to designate like parts throughout the same:

FIG. 1 is a vertical section through an electromechanical transducer and coupling unit constructed in accordance with the present invention;
FIG. 2 is an enlarged detailed sectional view illustrating the transducer mounting arrangement;
FIG. 3 is a section taken on the line 3—3 of FIG. 1;
FIG. 4 is an enlarged sectional view corresponding to that of FIG. 2 and illustrating a modified transducer arrangement;
FIG. 5 is a reduced face view of the transducer of FIG. 4;
FIG. 6 is a sectional view corresponding to that of FIG. 3 and illustrating a modified arrangement;
FIG. 7 is a side elevational view illustrating a modified transducer arrangement; and
FIG. 8 is a view illustrating a modified wheel type transducer and coupling unit in accordance with the present invention.

Referring now to the drawings and particularly to FIG. 1, there is shown for purposes of illustrative disclosure, a complete electromechanical transducing and coupling unit 10 for use in continuous progressive ultrasonic rail flaw testing. The unit is shown mounted for movement along the running surface of a rail R for coupling ultrasonic energy between an ultrasonic machine that may be mounted on a suitable detector car (not shown) and the rail R.

A vibration element is shown at 12 mounted at the upper end of a vertically elongated holder tube 11 of generally circular cross section through which a solid stream of coupling liquid flows downwardly to continuously provide a column of coupling liquid for transmitting vibrations between the transducer and rail.

In accordance with this invention an infinite impedance broad band transducer arrangement is provided for achieving high resolution and accomplishing testing close to the entering or running surface of the rail. Accordingly, the vibration element 12 consists of a foil of current carrying material and may be as thin as 0.001 inch.

Opposite edges of the foil are mounted along opposite sides of a generally rectangular flange 11F on the top of the tube to dispose the freely movable central region of the foil in facing relation beneath a vertically oriented pole of a magnet unit 13 which provides a flux field through which the foil extends in a horizontal direction. A strong permanent magnet of any suitable type may be used for the magnet unit. A thin sheet 14 of butyl rubber or other suitable material may be secured between the foil 12 and the magnet unit to isolate foil vibration from the magnet.

The foil is shown connected through lead wires 12L to the secondary 15S of a radio frequency transformer 15 which is connected across the output of an ultrasonic machine 16 arranged to supply current signals to the foil. The current signals may be as short in duration as 1/4 or 1/2 wave or may comprise a small number of cycles of electrical energy at a frequency on the order of 2 to 3 megacycles though this may vary widely.

The current in the foil produces an electric field which reacts with the flux field of the magnet to cause the center of the edge mounted foil to vibrate in accordance with the wave shape of the current signals. Since the foil is thin its resonant point ranges somewhere between 20 and 100 megacycles and, therefore, it is obviously free of objectionable mechanical ringing.

In the illustrated arrangement, the vertically oriented pole of the magnet unit 13 defines a vertically oriented magnet axis about which the field is centered. The typical flux field of such a bar magnet has a mushrooming pattern wherein the lines of force flare outwardly and curve reversely to return to the opposite end of the magnet. The foil is disposed in the flux field and extends in a direction crosswise of the magnet axis. Actually only a few lines of force are truly perpendicular to the plane of the foil and therefore most of the lines of force have a component effect capable of reacting with the field produced by the foil to vibrate the foil in the direction of the magnet axis.

In FIGS. 2 and 3, the foil is illustrated as comprising a generally rectangular metal ribbon of either brass or copper which may have a thickness on the order of from 0.001 inch to 0.005 inch. The ribbon foil is secured across the upper end of the holder tube by means of contact bars 17 and 18 secured along opposite edges of the foil with the contact bars being anchored to the flange 11F of the tube by suitable screws 19. Accordingly, the tube 11 is of Bakelite or other similar insulating material. With this arrangement the impedance in the secondary of the transformer 15 is on the order of $\frac{1}{10}$ ohm and even a one turn secondary coil is ample for generating several hundred amperes in the foil at low voltage.

Where desired for purposes of achieving increased efficiency, the flat foil 12 may be of the form shown in FIGS. 4 and 5 wherein a wire preferably of flat cross-sectional configuration is shown coiled into a spiral shape to provide a substantially planar current carrying foil. The spiral coil has a somewhat higher electrical impedance (on the order of 5 to 10 ohms) for providing a better match with commercially available transformers and for mounting purposes it is shown united to a plastic sheet 21 for providing a coherent planar vibration foil. Clamping bars 17' and 18' are secured along opposite edges of the plastic sheet and are fixed to the holder tube flange 11F by suitable screws 19 to mount the spiral coil crosswise beneath the lower pole face of the magnet unit, with the lead wires 12L being connected directly to the ends of the coil. The use of copper wire for the spiral coil type of foil is preferred since copper, being a very poor conductor of high frequency mechanical vibrations, is free of any tendency to resonate or ring.

The generation of vibrations in the foil may simultaneously induce a magnetic shock wave through the magnet unit, the reflection and return of which would appear as a false signal in the ultrasonic system, and if desired the magnet may be arranged to have a travel path sufficiently great that the magnetic shock wave arrives later than the desired signals reflected from the body under test. A magnet of sintered ceramic would be suitable as it is a poor conductor of ultrasonic vibrations.

Preferably, the magnet unit 13 (see FIG. 1) comprises a sintered ceramic permanent magnet body 13M having an insert 13C of sintered ceramic material interposed between its lower pole face and the foil 12. The use of such an insert substantially eliminates the magnetic shock wave effect. An alternative construction is illustrated in FIG. 6 wherein the magnet body is shown as comprising a plurality of elongated correspondingly polarized magnetic rods 13R arranged in circular array.

While one of the principal features of the invention is the use of a non-resonant foil for eliminating ringing, the foil may, if desired, be fitted with a resonant lens 23 (see FIG. 7) of glass, quartz, metal, or similar material united flush with the foil to resonate and provide sustained vibrations when the foil is actuated with current signals at or near the resonant frequency of the lens.

While the vibration foils of this invention may be used for contact testing, a test body such as a track rail can exert undesirable inductance effects due to the magnetic characteristics of the rail. Accordingly, the infinite impedance foil type transducer of this invention is preferably mounted at the top of the holder tube in suitably spaced relation to the track rail. A liquid column is provided within the holder tube for coupling the foil to the rail and this arrangement also isolates magnetic shock effects from the rail and thus eliminates another source of false indications.

In the preferred coupling arrangement illustrated herein a solid flow stream is provided moving vertically downwardly through the holder tube 11 to provide a continuous column of coupling liquid that transmits the vibrations between the vibratile foil and the rail. The tube has an inlet 25 for the coupling liquid and located substantially at the elevation of the vibratile foil to first direct the incoming stream of coupling liquid crosswise of the foil face for continuously sweeping it free of gas bubbles tending to collect there and thereafter the liquid stream flows vertically downwardly through the tube at a rate sufficient to prevent gas bubbles from rising through the tube.

The tube is disposed within the open center of an endless support frame 26 that is provided with a series of clamps 27 for mounting a liquid confining diaphragm 28 across the frame. A ring shaped housing 29 is fixed around the lower end of the holder tube 11 to define a liquid collecting chamber thereabout, this housing and tube both being spaced a slight distance above the diaphragm to establish open communication therebetween. A liquid suction line 30 is connected in an outlet opening provided in the housing for the liquid collecting chamber for reclaiming and recirculating coupling liquid through the holder tube.

It will be apparent that the stream of coupling liquid continuously flowing downwardly through the holder tube impinges against the diaphragm to continuously hold it against the rail surface and establish an efficient ultrasonic transmission path. The disclosed arrangement has the important advantage that the liquid stream being in motion continuously urges the diaphragm to deflect downwardly as necessary to cause the diaphragm to intimately conform to the shape of abnormal surface contours of the rail. In the past, in ultrasonic rail testing, liquid confining walls have been used as ultrasonic transmission diaphragms in conjunction with static liquid columns and in numerous instances, such as at rail ends and at other regions where surface irregularities occur, it has not always been possible to maintain ultrasonic coupling due to the difficulty of moving the relatively substantial mass, represented by the static column of coupling liquid, through a displacement of as much as $\frac{1}{16}$ of an inch in $\frac{1}{100}$ of a second.

In the present arrangement where the liquid is already in motion it provides the motivating energy for causing the required rapid displacement of the diaphragm. It will be apparent that the thinner the diaphragm, the faster its response and the more perfectly it conforms to the varied contour of the rail. The combination of an ultrasonic transmission diaphragm in direct contact with the rail and a moving liquid column provides an efficient ultrasonic transmission path while eliminating the difficult problems previously encountered where the dirt, grease, sand and other foreign matter on the rail have gained access into the coupling liquid system. When the liquid remains clean, the reclaiming and recirculating system may function more efficiently.

The system may be operated with liquid present throughout the entire expanse of the containing frame 26 in which instance the housing 29 can be omitted and the suction line 30 may communicate directly with any selected region within the containing frame. However, it is preferred that the system be operated wherein the liquid is confined within the housing 29 so that no liquid and consequently no liquid pressure acts against the portions of the diaphragm that do not underlie the holder tube. To facilitate fast efficient reclaiming, a rubber wiper ring 31 is mounted as an exterior depending skirt on the housing 29 and is disposed in wiping engagement with the diaphragm to create the desired seal. The skirt may actually be permanently joined to the diaphragm to completely close the system against any possible leakage of water though this restricts its freedom of movement. The ability of the diaphragm to conform to contour changes is enhanced if the coupling liquid is localized to only its central region against which the liquid impinges.

A sheet .030 inch thick made of a material such as is marketed under the trademark Teflon is suitable for use as the liquid confining diaphragm. Teflon is tough and strong and has a lubric surface characteristic that gives it additional advantages for progressive ultrasonic rail testing.

In the above described coupling arrangement wherein the vibration foil is located over the top or running surface of the rail and where water is used as the liquid couplant a stream flow rate of on the order of 2 feet per second is employed to overcome the tendency of gas bubbles to move upwardly through the flow passage. At this speed, the stream carries the bubbles downwardly and out of the holder tube 11 to minimize the appearance of "hash" in the reflected signals. Assuming the flow passage to have a one inch diameter, a flow rate of 5 gallons per minute is required for providing a 2 foot per second flow stream velocity. The coupling arrangement shown wherein also makes cold weather testing possible since it is no longer necessary that the coupling liquid contact the rail directly; the use of the ultrasonic transmission diaphragm being practicable where a flowing liquid column is provided to impinge against and hold the diaphragm flush against the rail surface for establishing efficient ultrasonic contact.

An alternative arrangement of the coupling apparatus is illustrated in FIG. 8 wherein the holder tube 11, together with its attached housing 29 and skirt wiper 31, are located within a tire shaped container 33 which serves as the liquid confining ultrasonic transmission diaphragm. The details for mounting the tire shaped container for rolling movement along the rail will be apparent to those skilled in this art and it will be noted that the tire type of diaphragm has the added advantages of eliminating sliding friction between the diaphragm and rail and of more evenly distributing the wear. The tire may be formed entirely of diaphragm material or may have diaphragm material in the form of a central cylindrical strip connected to side walls of any suitable construction.

It should be understood that the description of the preferred form of the invention is for the purpose of complying with Section 112, Title 35, of the United States Code, and that the appended claims should be construed as broadly as the prior art will permit.

We claim:

1. In ultrasonic testing equipment, coupling apparatus for forming and flowing a solid stream of coupling liquid between an elastic wave emitter and a test body for transmitting elastic vibrations therebetween, said apparatus comprising elongated holder tube structure mounting said emitter at an end thereof remote from said body and providing a substantially straight elongated flow passage having a discharge path and an axis directed towards said body, a frame encircling the axis of the flow passage and stationarily mounting a liquid retaining sheet-like diaphragm of flexibly conformable elastic wave transmitting material spaced endwise from the discharge end of said holder tube structure and having a central region thereof disposed crosswise in said discharge path in position to contact said body, said diaphragm being substantially greater in size than the transverse area of said discharge path and extending transversely thereof in all directions, with said frame and diaphragm constituting a liquid collecting chamber in communication with the discharge end of said flow passage, means including a line connected to said holder tube structure to communicate with the flow passage thereof at a region adjacent said emitter for supplying ultrasonic energy transmitting coupling liquid into said passage at a rate to produce a solid stream of bubble-free coupling liquid flowing through said flow passage to discharge along said path and impinge upon the diaphragm and thereby exert sufficient inertia pressure thereagainst to urge the same against the body with sufficient force to cause it to continuously conform to the surface contour of said body, a liquid suction line connected to said liquid collecting chamber for continuously reclaiming liquid therefrom, and a skirt encircling and sealed against said holder tube structure adjacent the discharge end thereof and projecting into sealing enagement against said diaphragm for defining the liquid collecting chamber with which said suction line communicates.

2. In ultrasonic testing equipment, an electromechanical transducing and coupling unit for transmitting vibrations to and from a test body and comprising an elongated holder tube providing a substantially straight elongated flow passage having a discharge path directed toward said body, a bar magnet disposed adjacent the end of said tube remote from said body and having a pole face spanning said end for radiating a flux field in a direction of a magnetic axis oriented generally lengthwise of said tube, a foil spanning the remote end of said tube and disposed to extend in said flux field in a direction generally crosswise of said axis, means for providing current variations through said foil to produce an electric field varying in intensity in accordance with said current variations and interacting with said flux field to produce corresponding vibration of said foil in the direction of said axis, means mounting a diaphragm of elastic wave transmitting material spaced endwise from the discharge end of said tube structure and disposed crosswise of said discharge path and in position to contact said body, and means including a line connected to said holder tube to communicate with the flow passage thereof at a region adjacent said emitter for supplying ultrasonic energy transmitting coupling liquid into said passage to produce a solid stream of bubble-free coupling liquid flowing through said flow passage to discharge along said path and impinge upon the diaphragm and urge the same against the body to cause it to continuously conform to the surface contour of said body.

3. In an ultrasonic rail testing system wherein an elastic wave emitting element is continuously progressed along longitudinally successive portions of a track rail, coupling apparatus for transmitting vibrations to and from the rail and comprising an elongated holder tube providing a substantially straight elongated flow passage having a discharge path directed toward said rail, a bar magnet disposed adjacent the end of said tube remote from said rail and having a pole face spanning said end for radiating a flux field in a direction of a magnetic axis of said bar magnet, said axis extending generally lengthwise of said tube, a foil spanning the remote end of said tube and disposed to extend in said flux field in a direction crosswise of said axis, means for providing current variations through said foil to produce an electric field varying in intensity in accordance with said current variations and interacting with said flux field to produce corresponding vibration of said foil in the direction of said axis, a frame movable jointly with said holder tube along said rail and mounting a liquid retaining diaphragm of elastic wave transmitting material spaced endwise from the discharge end of said holder tube and disposed crosswise of said discharge path and in position to contact said rail, with said frame and diaphragm constituting a liquid collecting chamber in communication with the discharge end of said flow passage, means including a line connected to said holder tube to communicate with the flow passage thereof at a region adjacent said emitter for supplying ultrasonic energy transmitting coupling liquid into said passage to produce a solid stream of bubble-free coupling liquid flowing through said flow passage to discharge along said path and impinge upon the diaphragm and urge the same against the rail to cause it to continuously conform to the surface contour of said rail, and a liquid suction line connected to said liquid collecting chamber for continuously reclaiming liquid therefrom.

4. In an ultrasonic rail testing system wherein an elastic wave emitting element is continuously progressed along longitudinally successive portions of a track rail, coupling apparatus for transmitting elastic vibrations between the momentarily facing surfaces of said element and rail, said apparatus comprising elongated holder tube structure providing a substantially straight elongated flow passage having a discharge path directed towards said rail, a bar magnet disposed adjacent the end of said tube remote from said rail and having a pole face spanning said end for radiating a flux field in a direction of a magnetic axis of said bar magnet, said axis extending generally lengthwise of said tube, a foil spanning said remote end of said tube and disposed to extend in said flux field in a direction crosswise of said axis, means for providing current variations through said foil to produce an electric field varying in intensity in accordance with said current variations and interacting with said flux field to produce corresponding vibration of said foil, means providing a liquid collecting chamber communicating with said flow passage adjacent the discharge end thereof, means including a line connected to said flow passage at a region thereof adjacent said foil for supplying ultrasonic energy transmitting coupling liquid into said flow passage to produce a solid stream of bubble-free coupling liquid flowing vertically downwardly through said flow passage and into said chamber at a flow stream rate greater than the rate of rise of gas bubbles through said liquid for continuously sweeping away gas bubbles attempting to enter said flow passage at the discharge end thereof, and a liquid suction line connected to said chamber for continuously reclaiming liquid therefrom.

5. An ultrasonic electromechanical transducing and coupling unit comprising an elongated holder tube and means for maintaining a column of coupling liquid therein, a bar magnet disposed at one end of said tube and having a pole face spanning said end for radiating a flux field defining a magnetic axis in a direction generally lengthwise of said tube, a foil spanning said end of said tube and disposed to extend in said flux field in a direction crosswise of said axis and means for providing current variations through said foil to produce an electric field that varies in intensity in accordance with said current variations and that interacts with said flux field to produce corresponding vibration of said foil in the direction of said axis, with said foil contacting said column of coupling liquid to transmit vibrations through said liquid towards the other end of said tube.

6. An ultrasonic electromechanical transducing and coupling unit comprising an elongated holder tube and means for maintaining a column of coupling liquid therein, means disposed adjacent one end of said tube for providing a flux field thereat defining a magnetic axis oriented in a predetermined direction, said field being of the type existing at a pole face region of a free bar magnet, a current carrying foil spanning said end of said tube and disposed to extend through said flux field in a direction crosswise of said axis for producing an electric field for interaction with said flux field, and current supplying means for varying one of said fields to produce corresponding vibration of said foil in the direction of said axis, with said foil contacting said column of coupling liquid to transmit vibrations through said liquid towards the other end of said tube.

7. The transducer and coupling unit of claim 5 wherein an insert of sintered ceramic material is interposed between said pole face of the bar magnet and said foil for eliminating magnetic shock wave effects.

8. In ultrasonic testing equipment, coupling apparatus for forming and flowing a solid stream of coupling liquid between an elastic wave emitter and a test body for transmitting elastic vibrations therebetween, said apparatus comprising elongated holder tube structure for mounting said emitter at an end thereof remote from said body and providing a substantially straight elongated flow passage having a discharge path directed towards said body, means mounting a sheet-like diaphragm of flexibly conformable elastic wave transmitting material spaced endwise from the discharge end of said holder tube structure and disposed crosswise in said discharge path in position to contact said body, said passage having cross-sectional dimensions corresponding to the size of said emitter and having a height of substantially greater dimension than its major cross-sectional dimension, means mounted to said holder tube structure and including endless wall structure encircling said passage in outwardly spaced relation thereto and extending downwardly into an endless line contact with said diaphragm to provide an enclosed liquid collecting chamber communicating with said flow passage at the discharge end thereof, means including a line connected to said flow passage at a region thereof adjacent said emitter for supplying ultrasonic energy transmitting coupling liquid into said flow passage to produce a solid stream of bubble-free coupling liquid flowing vertically downwardly through said flow passage and into said chamber to discharge along said path and impinge upon the diaphragm and thereby develop inertia pressure thereagainst acting to urge the same against the body to cause the diaphragm to conform continuously to the surface contour of said body, with said stream having a flow stream rate greater than the rate of rise of gas bubbles through said liquid for continuously sweeping away gas bubbles attempting to enter said flow passage at the discharge end thereof, and a liquid suction line connected to said chamber for continuously reclaiming liquid therefrom.

9. In ultrasonic testing equipment, coupling apparatus for forming and flowing a solid stream of coupling liquid between an elastic wave emitter and a test body for transmitting elastic vibrations therebetween, said apparatus comprising elongated holder tube structure for mounting said emitter at an end thereof remote from said body and providing a substantially straight elongated flow passage having a discharge path directed towards said body, means mounting a diaphragm of elastic wave transmitting material spaced endwise from the discharge end of said holder tube structure and disposed crosswise in said discharge path in position to contact said body, said passage having cross-sectional dimensions corresponding to the size of said emitter and having a height of substantially greater dimension than its major cross-sectional dimension, a skirt disposed to encircle and seal against said holder tube structure adjacent the discharge end thereof, said skirt projecting into sealing engagement with said diaphragm for providing a liquid collecting chamber communicating with said flow passage at the discharge end thereof, means including a line connected to said flow passage at a region thereof adjacent said emitter for supplying ultrasonic energy transmitting coupling liquid into said flow passage to produce a solid stream of bubble-free coupling liquid flowing vertically downwardly through said flow passage and into said chamber to discharge along said path and impinge upon the diaphragm and urge the same against the body to cause the diaphragm to conform continuously to the surface contour of said body, with said stream having a flow stream rate greater than the rate of rise of gas bubbles through said liquid for continuously sweeping away gas bubbles attempting to enter said flow passage at the discharge end thereof, and a liquid suction line connected to said chamber for continuously reclaiming liquid therefrom.

10. In ultrasonic testing equipment, coupling apparatus for forming and flowing a solid stream of coupling liquid between an elastic wave emitter and a test body for transmitting elastic vibrations therebetween, said apparatus comprising elongated holder tube structure for mounting said emitter at an end thereof remote from said body and providing a substantially straight elongated flow passage having an axis and a discharge path directed towards said body, a frame encircling the axis of the flow passage and stationarily mounting a liquid retaining diaphragm of elastic wave transmitting material spaced endwise from the discharge end of said holder tube structure and disposed crosswise in said discharge path in position to contact said body, said passage having cross-sectional dimensions corresponding to the size of said emitter and having a height of substantially greater dimension than its major cross-sectional dimension, a skirt disposed to encircle and seal against said holder tube structure adjacent the discharge end thereof, said skirt projecting into sealing engagement with said diaphragm for providing a liquid collecting chamber communicating with said flow passage at the discharge end thereof, means including a line connected to said flow passage at a region thereof adjacent said emitter for supplying ultrasonic energy transmitting coupling liquid into said flow passage to produce a solid stream of bubble-free coupling liquid flowing vertically downwardly through said flow passage and into said chamber to discharge along said path and impinge upon the diaphragm and urge the same against the body to cause the diaphragm to conform continuously to the surface contour of said body, with said stream having a flow stream rate greater than the rate of rise of gas bubbles through said liquid for continuously sweeping away gas bubbles attempting to enter said flow passage at the discharge end thereof, and a liquid suction line connected to said chamber for continuously reclaiming liquid therefrom.

11. In ultrasonic testing equipment, coupling apparatus for forming and flowing a solid stream of coupling liquid between an elastic wave emitter and a test body for transmitting elastic vibrations therebetween, said apparatus comprising elongated holder tube structure for mounting said emitter at an end thereof remote from said body and providing a substantially straight elongated flow passage having an axis and a discharge path directed towards said body, a frame encircling the axis of the flow passage and stationarily mounting a liquid retaining diaphragm of elastic wave transmitting material spaced endwise from the discharge end of said holder tube structure and disposed crosswise in said discharge path in position to contact said body, said passage having a major cross-sectional dimension on the order of one inch and having a height of substantially greater dimension than its major cross-sectional dimension, a skirt disposed to encircle and seal against said holder tube structure adjacent the discharge end thereof, said skirt projecting into sealing engagement with said diaphragm for providing a liquid collecting chamber communicating with said flow passage at the discharge end thereof, means including a line connected to said flow passage at a region thereof adjacent said emitter for supplying ultrasonic energy transmitting coupling liquid into said flow passage to produce a solid stream of bubble-free coupling liquid flowing vertically downwardly through said flow passage and into said chamber to discharge along said path and impinge upon the diaphragm and urge the same against the body to cause the diaphragm to conform continuously to the surface contour of said body, with said stream having a flow stream rate greater than the rate of rise of gas bubbles through said liquid for continuously sweeping away gas bubbles attempting to enter said flow passage at the discharge end thereof, and a liquid suction line connected to said chamber for continuously reclaiming liquid therefrom.

12. In ultrasonic testing equipment, coupling apparatus for forming and flowing a solid stream of coupling liquid between an elastic wave emitter and a test body for transmitting elastic vibrations therebetween, said apparatus comprising an elongated holder tube structure mounting said emitter at an end thereof remote from said body and providing a substantially straight elongated flow passage having a discharge path directed towards said body, means mounting a diaphragm of elastic wave transmitting material spaced endwise from the discharge end of said holder tube structure and disposed crosswise in said discharge path in position to contact said body, a skirt disposed to encircle and seal against said holder tube structure adjacent the discharge end thereof, said skirt projecting into sealing engagement with said diaphragm for providing a liquid collecting chamber communicating with said flow passage at the discharge end thereof, means including a line connected to said holder tube structure to communicate with the flow passage thereof at a region adjacent said emitter for supplying ultrasonic energy transmitting coupling liquid into said passage to produce a solid stream of bubble-free coupling liquid flowing through said flow passage to discharge along said path and impinge upon the diaphragm and urge the same against the body to cause the diaphragm to continuously conform to the surface contour of said body and a liquid suction line communicating with said chamber to continuously reclaim liquid therefrom.

13. The arrangement of claim 12 wherein a tire-shaped container constitutes said diaphragm.

References Cited by the Examiner
UNITED STATES PATENTS

| | | | |
|---|---|---|---|
| 1,471,547 | 10/1923 | Chilowsky et al. | 73—67.5 X |
| 2,064,316 | 12/1936 | Olson et al. | |
| 2,094,062 | 9/1937 | Darlington | 310—15 X |
| 2,378,237 | 6/1945 | Morris | 73—67.6 |
| 2,545,101 | 3/1951 | Meunier | 73—71.5 X |
| 2,545,309 | 3/1951 | Roberts | 73—67.6 |
| 2,873,391 | 2/1959 | Schulze | 310—8.3 |
| 2,978,671 | 4/1961 | Harris | 340—12 |
| 3,055,210 | 9/1962 | Joy | 73—71.5 |

FOREIGN PATENTS 654,673 12/1937 Germany.

RICHARD C. QUEISSER, *Primary Examiner.*

C. A. CUTTING, JOHN P. BEAUCHAMP, ROBERT L. EVANS, EMIL G. ANDERSON, JOSEPH P. STRIZAK, *Examiners.*